(12) United States Patent
Wagner et al.

(10) Patent No.: US 10,662,993 B2
(45) Date of Patent: May 26, 2020

(54) HIGH-STRENGTH SCREW INCLUDING AN UNHARDENED THREAD END

(71) Applicant: KAMAX Holding GmbH & Co. KG, Homberg (DE)

(72) Inventors: Frank Wagner, Grossen Buseck (DE); Harald Frischkorn, Homberg (DE)

(73) Assignee: KAMAX HOLDING GMBH & CO. KG, Homberg (OHM) (DE)

( * ) Notice: Subject to any disclaimer, the term of this patent is extended or adjusted under 35 U.S.C. 154(b) by 307 days.

(21) Appl. No.: 15/886,031

(22) Filed: Feb. 1, 2018

(65) Prior Publication Data

US 2018/0216652 A1    Aug. 2, 2018

(30) Foreign Application Priority Data

Feb. 1, 2017    (DE) .................. 10 2017 101 931

(51) Int. Cl.
| | |
|---|---|
| F16B 35/04 | (2006.01) |
| F16B 33/02 | (2006.01) |
| C21D 1/25 | (2006.01) |
| B23G 9/00 | (2006.01) |
| C21D 8/06 | (2006.01) |
| C21D 9/00 | (2006.01) |
| F16B 35/00 | (2006.01) |
| F16B 33/04 | (2006.01) |

(52) U.S. Cl.
CPC ............ *F16B 33/02* (2013.01); *B23G 9/001* (2013.01); *C21D 1/25* (2013.01); *C21D 8/06* (2013.01); *C21D 9/0093* (2013.01); *F16B 35/00* (2013.01); *C21D 2211/002* (2013.01); *F16B 2033/04* (2013.01)

(58) Field of Classification Search
CPC ........ C21D 2221/01; C21D 1/42; C21D 1/20; C21D 2211/00
USPC ........................................................ 411/424
See application file for complete search history.

(56) References Cited

U.S. PATENT DOCUMENTS

| | | | |
|---|---|---|---|
| 3,769,103 A | * | 10/1973 | Wardwell ................. C21D 1/42 148/573 |
| 3,894,570 A | | 7/1975 | Reynolds |
| 4,037,281 A | | 7/1977 | Reynolds |

(Continued)

FOREIGN PATENT DOCUMENTS

| | | |
|---|---|---|
| CN | 1316018 A | 10/2001 |
| CN | 1536236 A | 10/2004 |

(Continued)

OTHER PUBLICATIONS

European Search Report in related EP Application No. 18151127.0, dated May 28, 2018.

(Continued)

*Primary Examiner* — Gary W Estremsky
(74) *Attorney, Agent, or Firm* — Thomas | Horstemeyer, LLP

(57) ABSTRACT

A high-strength screw (1) includes a head (2) and a threaded portion (5) including a thread (6) and a thread end (9) facing away from the head (2) in an axial direction. The threaded portion (5) includes an unhardened portion (12) starting at the thread end (9) and extending in an axial direction. The unhardened portion (12) has a hardness being reduced compared to an axial middle portion (11) of the threaded portion (5).

18 Claims, 4 Drawing Sheets

(56) References Cited

U.S. PATENT DOCUMENTS

| | | | | |
|---|---|---|---|---|
| 4,958,972 | A | * | 9/1990 | Shinjo .................... B23K 11/14 411/387.1 |
| 5,350,467 | A | * | 9/1994 | Evans ................ B65G 47/1407 148/252 |
| 5,417,776 | A | * | 5/1995 | Yoshino .................... C23C 8/80 148/230 |
| 5,755,542 | A | * | 5/1998 | Janusz .................... F16B 33/06 411/387.4 |
| 6,109,851 | A | * | 8/2000 | Bauer ................. C21D 9/0093 411/387.7 |
| 6,332,741 | B1 | * | 12/2001 | Janusz .................... F16B 25/00 411/309 |
| 6,338,600 | B2 | * | 1/2002 | Friederich ................ C21D 6/02 411/386 |
| 6,386,810 | B1 | * | 5/2002 | Onoe ..................... F16B 33/06 411/411 |
| 6,488,787 | B1 | | 12/2002 | Ochi et al. |
| 7,247,099 | B2 | * | 7/2007 | Friederich ............ C21D 9/0093 148/587 |
| 8,876,451 | B2 | | 11/2014 | Kimura et al. |
| 9,145,910 | B2 | * | 9/2015 | Dieterle .................. F16B 35/00 |
| 9,440,215 | B2 | | 9/2016 | Chyou et al. |
| 2004/0023557 | A1 | | 11/2004 | Friederich et al. |
| 2012/0230800 | A1 | | 9/2012 | Kimura et al. |
| 2013/0129446 | A1 | | 5/2013 | Dieterle et al. |
| 2015/0147134 | A1 | | 5/2015 | Busby et al. |
| 2018/0031023 | A1 | * | 2/2018 | Hartmann .............. B23G 9/001 |
| 2019/0014141 | A1 | * | 1/2019 | Segal .................... G06F 21/554 |

FOREIGN PATENT DOCUMENTS

| | | |
|---|---|---|
| CN | 102352884 A | 2/2012 |
| CN | 102597543 A | 7/2012 |
| CN | 103148076 A | 6/2013 |
| CN | 204371870 U | 6/2015 |
| DE | 2 415 619 A1 | 11/1974 |
| DE | 28 31 439 A1 | 4/1979 |
| DE | 600 16 369 T1 | 5/2005 |
| DE | 11 2010 003 614 B4 | 11/2016 |
| EP | 0 861 379 B1 | 10/1996 |
| EP | 1 466 990 A1 | 3/2004 |
| EP | 2 594 653 A1 | 11/2012 |
| GB | 2 006 833 A | 5/1997 |
| WO | 97/16652 | 5/1997 |

OTHER PUBLICATIONS

Würth: "Manufacturing screws and nuts", pp. 1773-1776, Nov. 18, 2013.
Wikipedia: "Anlassen", Oct. 4, 2016 (German version of NPL Ref. 3).
Wikipedia: "Tempering (metallurgy)", Dec. 4, 2017.
Wikipedia: "Induktionshärten", Nov. 17, 2016 (German version of NPL Ref. 5).
Wikipedia: "Induction hardening", Nov. 18, 2017.
Chinese Office Action in related, co-pending Chinese Application No. 2018101016931, dated Dec. 12, 2019.

* cited by examiner

HIGH-STRENGTH SCREW INCLUDING AN UNHARDENED THREAD END

CROSS REFERENCE TO RELATED APPLICATIONS

This application claims priority to co-pending German Patent Application No. DE 10 2017 101 931.6 filed Feb. 1, 2017.

FIELD OF THE INVENTION

The invention relates to a high-strength screw including a head and a shank including a threaded portion including a thread having a thread end facing away from the head in an axial direction.

BACKGROUND OF THE INVENTION

An ultra-high-strength screw is known from European patent application No. EP 2 594 653 A1 corresponding to U.S. Pat. No. 9,145,910 B2.

A fastener manufacturing method is known from German patent No. DE 2 415 619 A1 corresponding to U.S. Pat. No. 4,037,281.

A method of manufacturing screws is described in document WORTH: "Manufacturing screws and nuts" (pages 1773-1776). The document describes the entire process of forming the shaft, rolling the thread and hardening and tempering the thread.

The article "Tempering (metallurgy)" from WIKIPEDIA describes the process of tempering.

The article "Induction hardening" from WIKIPEDIA describes the process of induction hardening.

A membrane reaction apparatus for recovering heat of reaction is known from German patent No. DE 600 16 369 T2 corresponding to U.S. Pat. No. 9,400,215 B2.

SUMMARY OF THE INVENTION

The invention relates to a high-strength screw including a head and a shank. The shank defines an axial direction and includes a threaded portion including a thread. The threaded portion has a first thread end facing away from the head in the axial direction and a second thread end facing the head in the axial direction. The threaded portion has an axial middle portion being located in the middle between the first thread end and the second thread end. The axial middle portion has a first hardness. The threaded portion includes an unhardened portion. The unhardened portion starts at the first thread end and extends in the axial direction towards the head. The unhardened portion has a second hardness being reduced compared to the first hardness of the axial middle portion.

The invention also relates to a method of manufacturing a high-strength screw including the following steps:
  manufacturing a blank including a head and a shaft by forming,
  heat-treating of the blank for attaining an increased hardness,
  reducing the hardness of the shaft in an unhardened portion starting at an axial portion of the shaft in which the thread end facing away from the head will be later located, and which extends in an axial direction only over a part of an axial portion of the shaft in which the threaded portion will be later located, and
  manufacturing a threaded portion by forming of a thread in the region of the shaft.

These method steps are conducted in the given order. However, it is also possible to conduct additional steps between these method steps.

The novel high-strength screw or ultra-high-strength screw can be manufactured at decreased tool wear without producing any chips.

A high-strength screw is to be understood as a screw having a tensile strength $R_m$ of at least 800 N/mm². High-strength screws are essentially understood as screws of the property classes 8.8, 10.9 and 12.9. However, the high-strength screw according to the invention may also be an ultra-high-strength screw having a tensile strength $R_m$ of at least 1400 N/mm². Such ultra-high-strength screws mostly belong to the property classes 14.8, 15.8 or 16.8. The "high-strength" screw according to the invention is thus at least a high-strength screw, but it can also be an ultra-high-strength screw.

For example, the new high-strength screw may be a screw including a threaded portion the axial end portion of which facing the head of the screw and the axial middle portion of which corresponding to an ultra-high-strength screw, the unhardened portion of which however "only" corresponding to a high-strength screw.

The term unhardened portion as used in this application is not a standard technical term. It is to be understood in this application as designating an axial part of the threaded portion of the screw which has a reduced hardness compared to the rest of the (non-unhardened) threaded portion. The term of unhardening is intended to express that the hardness has been reduced. It especially does not mean that the previously conducted process of hardening has been completely undone.

The hardness and the tensile strength is thus reduced in the end portion of the threaded portion of the thread facing away from the head of the screw. In many cases, this is the axial end of the screw. However, it is also possible that the threaded portion is not located at the axial end of the screw, but instead at any place between the axial end and the head of the screw. In both cases, the unhardened portion extends from this end of the threaded portion—i. e. the thread run-in—over a certain axial length of the threaded portion. However, it does not extend over the entire length of the threaded portion.

The average of the hardness and of the tensile strength in the unhardened portion is lower than the average of the hardness and of the tensile strength in the remainder of the threaded portion. To improve reference compared to the term of the "remainder" of the threaded portion, this application refers to the axial middle portion of the threaded portion.

Due to the new unhardened portion in this part of the thread end, the screw is relieved in multiple ways. This relief especially concerns the dome of the thread end—i. e. the axial portion of the thread run-in in which the outer diameter of the thread reaches its maximum size for the first time. There are various problems in the prior art in the region of this dome. First of all, there is uneven force distribution at this place acting upon the flanks of the thread at the rolling tool during manufacture of the thread. This results in increased wear at the rolling tool in the prior art.

Another problem in the prior art is the risk of fatigue fracture at the tightened component in the region of the corresponding inner thread. There is a tension concentration due to the tip of the thread of the screw.

According to the invention, there is less stress at this dome in the region of the thread run-in due to the reduced hardness and tensile strength of the threaded portion of the new screw during manufacture of the thread as well as when tightening the thread. This means that there is less wear at the rolling tools and fewer damages and cracks at the tightened component.

Due to the new unhardened portion, it is possible to even produce ultra-high-strength screws by a one-step rolling method. The two-step thread rolling process known from the prior art is not required. Other machining methods for reducing stress concentration in the component are also not required.

The fatigue strength of the new high-strength screw—especially the new ultra-high-strength screw—is thereby substantially improved compared to the prior art. For example, an increase of the fatigue strength $\delta_{A50}$ by approximately between 20 N/mm$^2$ and 50 N/mm$^2$ to approximately 150 N/mm$^2$ or more is possible.

The hardness of the unhardened portion may be at least 50 HV lower compared to the axial middle portion of the threaded portion. It may be between 50 HV and 300 HV, especially between 100 HV and 250 HV, lower. The tensile strength of the unhardened portion may be at least 100 N/mm$^2$ lower compared to the axial middle portion of the threaded portion. Especially, it may be between 100 N/mm$^2$ and 700 N/mm$^2$, especially between 200 N/mm$^2$ and 500 N/mm$^2$, lower.

The hardness of the unhardened portion may be between 15% and 50%, especially between 20% and 40%, lower compared to the axial middle portion of the threaded portion. The tensile strength of the unhardened portion may be between 15% and 50%, especially between 20% and 50%, lower compared to the axial middle portion of the threaded portion.

This numerical reduction of the hardness and of the tensile strength of the threaded portion in the unhardened portion leads to less wear occurring at the rolling tool during manufacture of the thread. In addition, there is less failure of components during connection of the screw to a component.

The unhardened portion only extends over a part of the axial length of the threaded portion. This partial length covers the end of the thread facing away from the head and the dome of the thread run-in—i. e. the portion winding about the circumference of the screw corresponding to the pitch of the thread in which the maximum outer diameter of the thread is reached for the first time.

To ensure that at least this portion of the dome is covered by the unhardened portion, the unhardened portion may extend over twice, especially three times, the pitch of the thread. In other words, the thread of the screw has fully wound about the screw twice and three times, respectively.

To ensure that the thread does not fully lose the desired positive effect of increased hardness and tensile strength, the unhardened portion at least ends before the axial middle portion of the threaded portion. The length of the unhardened portion may maximally correspond to eight times, especially maximally seven times, especially maximally six times, the pitch of the thread. In this way, it is sufficiently ensured that the region of the threaded portion is covered in which otherwise the above-described negative effects during manufacture of the thread and during tightening of the screw would occur. The remainder of the thread has the desired great hardness and tensile strength as one expects from this high-strength screw.

The thread may have the usual standard design in the unhardened portion. This means that there is a usual thread run-in. There are no other special geometrical measures at this place, as, for example, bores or additional chamfers. The usual chamfer at the end of the thread run-in and of the shaft however exists. Relief of the thread run-in may thus be exclusively achieved by the unhardened portion.

In the above-described method of manufacturing a high-strength screw, reducing the hardness may be realized by inductive heating of the blank. This is especially achieved by a live coil being subjected to an electromagnetic alternating field and producing eddy currents in the material of the blank. Since these flow in the opposite direction than the initial current, heat is created.

Cooling of the blank may follow the inductive heating of the blank. This is especially advantageous if heating of the steel and of the surface layer, respectively, is limited to a temperature below the beginning of austenite transformation Ac1 of between 500° C. and 750° C., especially between 600° C. and 723° C. Due to the coordination of the steps of heating and cooling, the desired reduction of the hardness and of the strength is attained. Cooling is especially realized by water having a temperature of approximately 10° C. to approximately 50° C. Cooling may occur over a period of time of between approximately 0.05 s and 30 s, especially between approximately 0.1 s and 10 s.

Inductive heating may be realized at a frequency of between 20 kHz and 500 kHz, especially between approximately 100 kHz and 400 kHz.

Inductive heating may be realized over a period of time of between approximately 0.05 s and 30 s, especially between approximately 0.1 s and 10 s.

However, the reduction of the hardness by heating the blank may also be realized by a laser, for example. Especially, controlled cooling for attaining the desired reduction of the hardness of the unhardened portion may follow this heating.

In all above-described method steps, the screw may include one or more of the above-described features.

Heat treatment may be especially austempering. The forming for producing the threaded portion may be especially rolling. Especially, the process may be cold forming.

The new high-strength screw may include a bainite structure which especially has at least partly been produced by austempering. The bainite structure results in an extremely high tensile strength while ductility is still also very high. This high ductility or toughness differentiates the bainite structure substantially from a martensite structure which is produced in the prior art in a known way by hardening and following annealing. Instead, during austempering, hardening is realized by rapid cooling from the austenite phase due to an isothermal structural transformation in the bainite phase. The element, especially the screw, is located in a salt bath at an isothermal temperature until the structural transformation from austenite to bainite has been completed over the entire cross-section. The annealing step being required during martensite hardening may be preferable omitted. Thus, the tendency of hardening distortion is reduced.

The starting material used for producing the high-strength screw is usually called "wire". The wire used for the new high-strength screw may be made of cold formable non-hardened and non-tempered steel, and it may have a carbon content of approximately 0.2% to 0.6% or approximately 0.2% to 0.5%. The steel may include alloying elements, especially Cr, Mo, Mn, Ni, V, Nb or Ti with a total share of especially more than approximately 1.1%.

Advantageous developments of the invention result from the claims, the description and the drawings. The advantages of features and of combinations of a plurality of features mentioned at the beginning of the description only serve as examples and may be used alternatively or cumulatively without the necessity of embodiments according to the invention having to obtain these advantages. Without changing the scope of protection as defined by the enclosed claims, the following applies with respect to the disclosure of the original application and the patent: further features may be taken from the drawings, in particular from the illustrated designs and the dimensions of a plurality of components with respect to one another as well as from their relative arrangement and their operative connection. The combination of features of different embodiments of the invention or of features of different claims independent of the chosen references of the claims is also possible, and it is motivated herewith. This also relates to features which are illustrated in separate drawings, or which are mentioned when describing them. These features may also be combined with features of different claims. Furthermore, it is possible that further embodiments of the invention do not have the features mentioned in the claims.

The number of the features mentioned in the claims and in the description is to be understood to cover this exact number and a greater number than the mentioned number without having to explicitly use the adverb "at least". For example, if an unhardened portion is mentioned, this is to be understood such that there is exactly one unhardened portion or there are two unhardened portions or more unhardened portions. Additional features may be added to these features, or these features may be the only features of the respective product.

BRIEF DESCRIPTION OF THE DRAWINGS

In the following, the invention is further explained and described with respect to preferred exemplary embodiments illustrated in the drawings.

DETAILED DESCRIPTION

Figure 1:
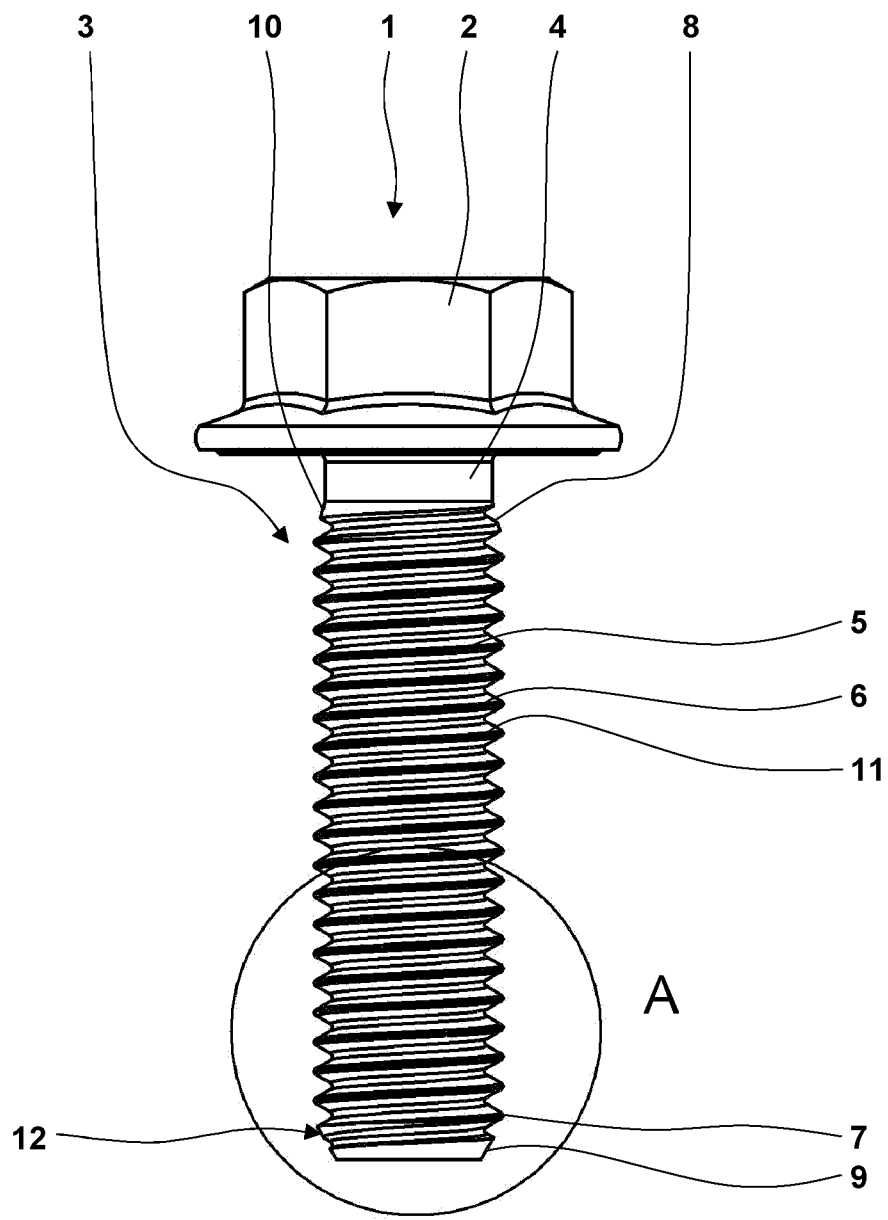
FIG. 1 illustrates a view of an exemplary embodiment of the new high-strength screw.
Figure 2:
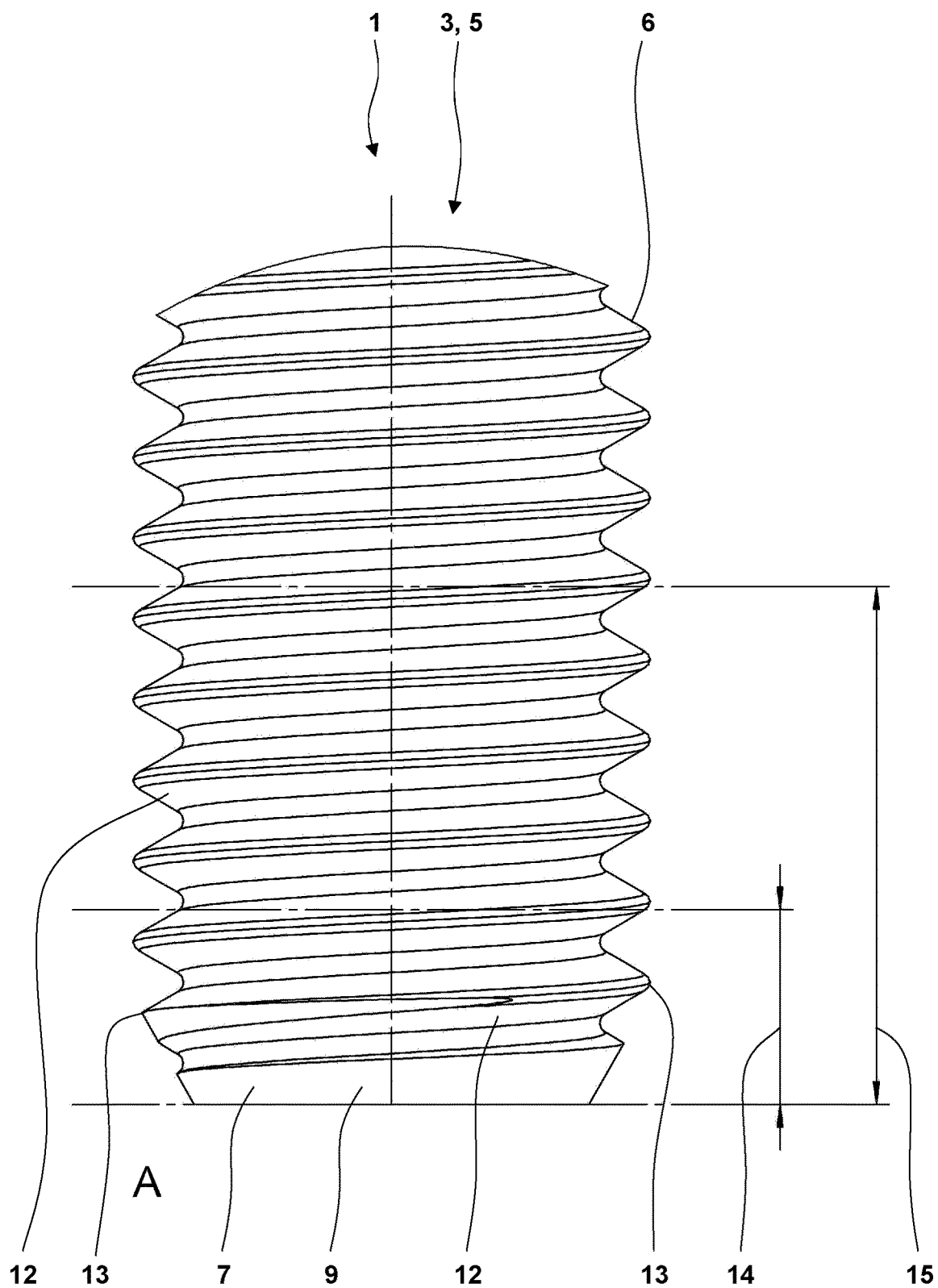
FIG. 2 illustrates detail A of the threaded portion of the screw according to FIG. 1.
Figure 3:
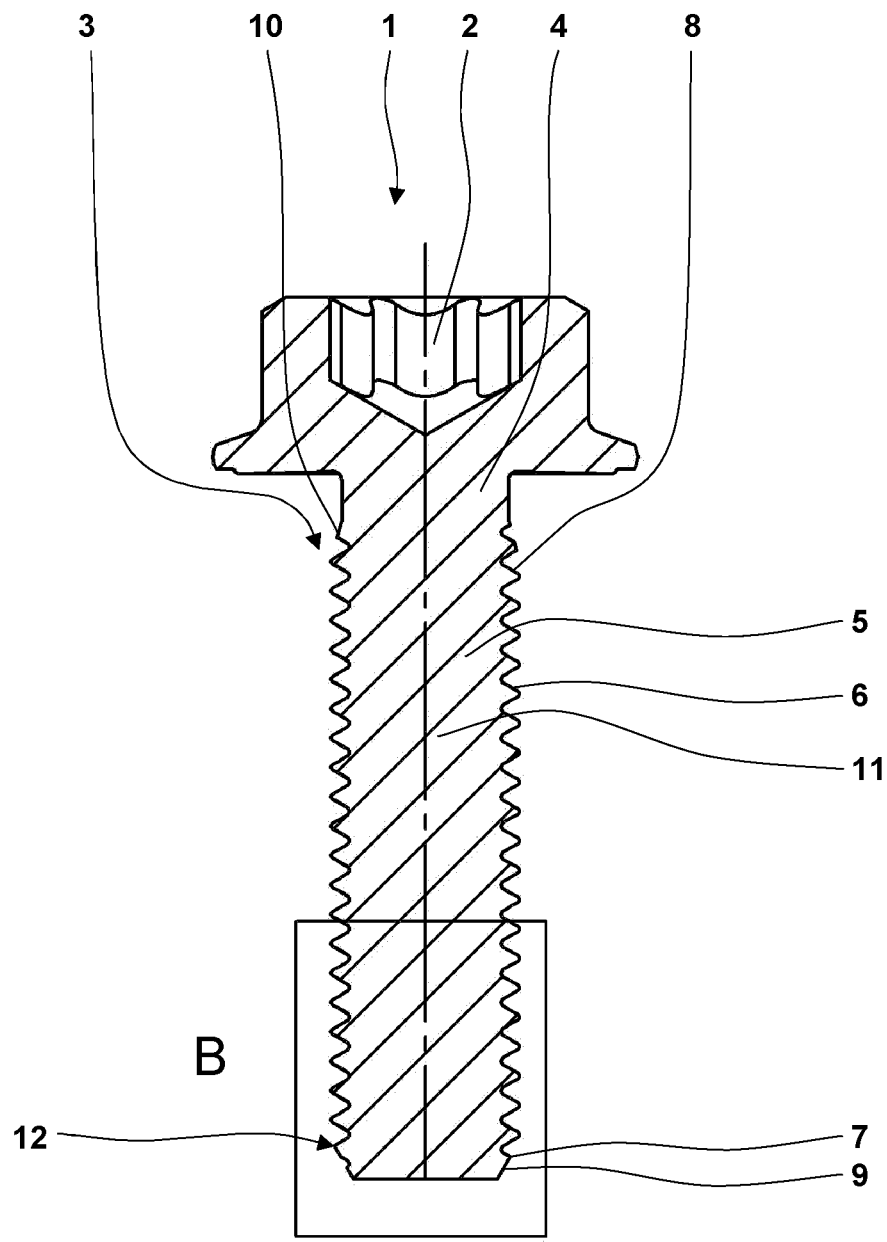
FIG. 3 illustrates a sectional view of the screw according to FIG. 1.
Figure 4:
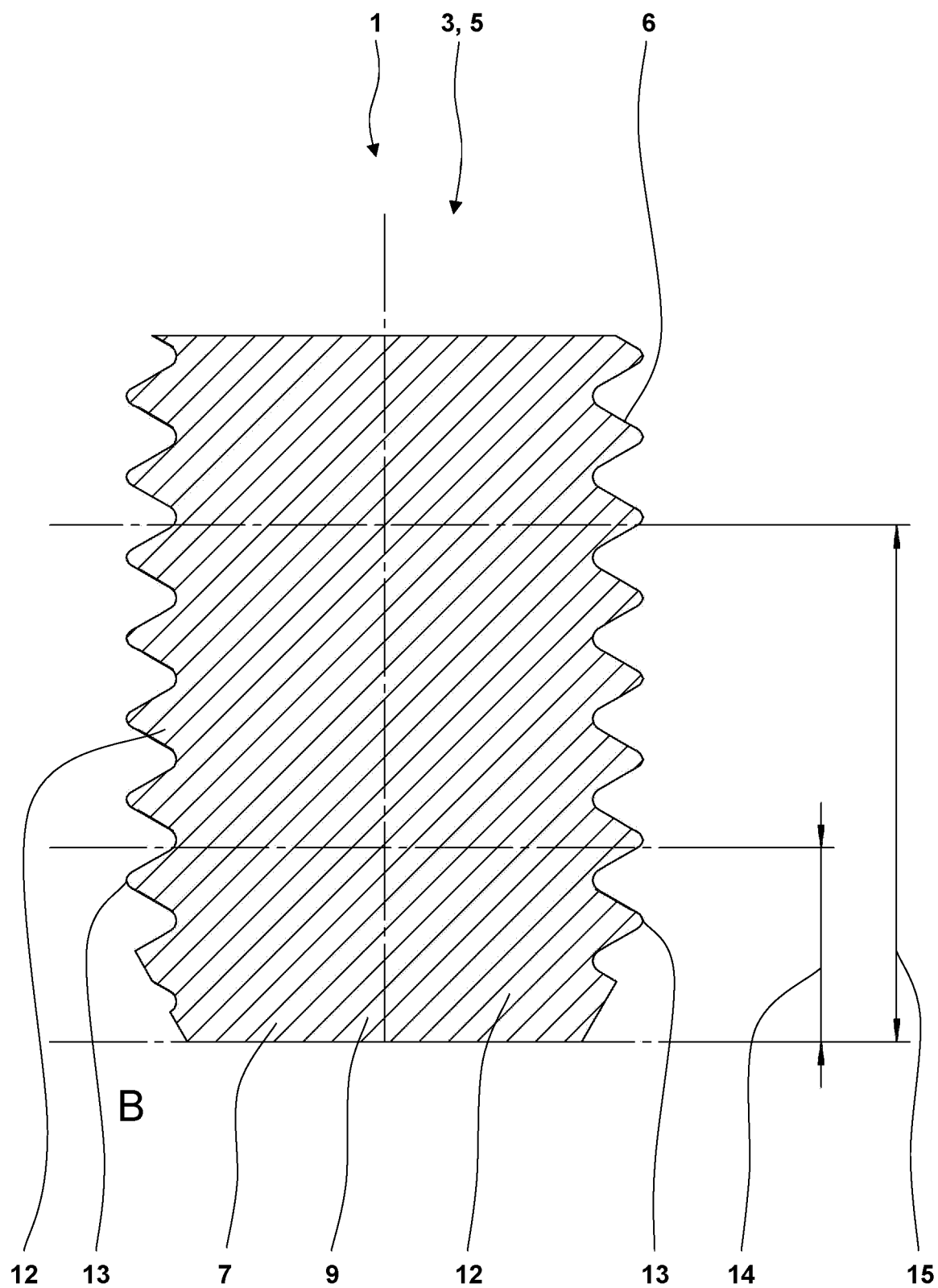
FIG. 4 illustrates detail B of the threaded portion of the screw according to FIG. 3.

FIG. 1-4 illustrate different views of an exemplary embodiment of a new high-strength screw 1. The screw 1 is a high-strength screw 1 having a tensile strength of at least 800 N/mm$^2$, especially an ultra-high-strength screw 1 having a tensile strength of at least 1400 N/mm$^2$. The screw 1 includes a bainite structure that has especially been produced by austempering and that extends substantially over the entire cross-section of the screw 1.

The screw 1 includes a head 2 and shaft 3. The head 2 includes a usual tool engagement contour. The shaft 3 includes a threadless shaft portion 4 and a threaded portion 5 including a thread 6. In this case, the thread 6 is designed as a metric thread. However, it could also be designed as a different thread 6.

The threaded portion 5 includes a thread run-in 7 and a thread run-out 8. It furthermore includes a thread end 9 facing away from the head 2 and a thread end 10 facing the head 2. Correspondingly, an axial middle portion 11 of the threaded portion 5 is arranged in the middle between these two thread ends 9, 10.

As it is indicated by reference numeral 12, the threaded portion 5 includes an unhardened portion 12. The unhardened portion 12 starts at the thread end 9 and extends in an axial direction over a partial length of the threaded portion 5. There is reduced hardness and tensile strength in the unhardened portion 12 compared to the axial middle portion 11 of the threaded portion 5. The hardness of the unhardened portion 12 may be between 15% and 50% lower compared to the axial middle portion 11 of the threaded portion 5.

The unhardened portion 12 extends in the axial direction at least to and beyond a dome 13 of the threaded portion 5, i. e. the region of the threaded portion 5 in which the thread 6 reaches its maximum outer diameter for the first time.

As it is emphasized by way of example by the two lines 14, 15, the unhardened portion 12 may extend in the sense of line 14 over a minimum length of at least three times the pitch of the thread 6.

According to line 15, the unhardened portion 12 may extend over a maximum length corresponding to the maximums of six times the pitch of the thread 6. However, it is to be understood that other numerical values and especially the other numerical values mentioned in this application may be used.

Many variations and modifications may be made to the preferred embodiments of the invention without departing substantially from the spirit and principles of the invention. All such modifications and variations are intended to be included herein within the scope of the present invention, as defined by the following claims.

We claim:

1. A high-strength screw, comprising:
   a head; and
   a shank defining an axial direction and including a threaded portion including a thread,
      the threaded portion having a first thread end facing away from the head in the axial direction,
      the threaded portion having a second thread end facing the head in the axial direction,
      the threaded portion having an axial middle portion being located in the middle between the first thread end and the second thread end, the axial middle portion having a first hardness, and
      the threaded portion including an unhardened portion, the unhardened portion starting at the first thread end and extending in the axial direction towards the head, the unhardened portion having a second hardness being reduced compared to the first hardness of the axial middle portion.

2. The screw of claim 1, wherein the second hardness of the unhardened portion is at least 50 HV lower than the first hardness of the axial middle portion.

3. The screw of claim 1, wherein the second hardness of the unhardened portion is between 50 HV and 300 HV lower than the first hardness of the axial middle portion.

4. The screw of claim 1, wherein the second hardness of the unhardened portion is between 100 HV and 250 HV lower than the first hardness of the axial middle portion.

5. The screw of claim 1, wherein
   the axial middle portion has a first tensile strength,
   the unhardened portion has a second tensile strength, the second tensile strength of the unhardened portion being at least 100 N/mm$^2$ lower than the first tensile strength of the axial middle portion.

6. The screw of claim 1, wherein
   the axial middle portion has a first tensile strength,
   the unhardened portion has a second tensile strength, the second tensile strength of the unhardened portion being between 100 N/mm² and 700 N/mm² lower than the first tensile strength of the axial middle portion.

7. The screw of claim 1, wherein
the axial middle portion has a first tensile strength,
the unhardened portion has a second tensile strength, the second tensile strength of the unhardened portion being between 200 N/mm² and 500 N/mm² lower than the first tensile strength of the axial middle portion.

8. The screw of claim 1, wherein the second hardness of the unhardened portion is between 15% and 50% lower than the first hardness of the axial middle portion.

9. The screw of claim 1, wherein the second hardness of the unhardened portion is between 20% and 40% lower than the first hardness of the axial middle portion.

10. The screw of claim 1, wherein
the axial middle portion has a first tensile strength,
the unhardened portion has a second tensile strength, the second tensile strength of the unhardened portion being between 15% and 50% lower than the second tensile strength of the axial middle portion.

11. The screw of claim 1, wherein
the axial middle portion has a first tensile strength,
the unhardened portion has a second tensile strength, the second tensile strength of the unhardened portion being between 20% and 40% lower than the second tensile strength of the axial middle portion.

12. The screw of claim 1, wherein
the thread has a pitch,
the unhardened portion has an axial length, the axial length extending over at least twice the pitch.

13. The screw of claim 1, wherein
the thread has a pitch,
the unhardened portion has an axial length, the axial length extending over at least three times the pitch.

14. The screw of claim 12, wherein the axial length extends over a maximum of one selected from the group consisting of: eight times, seven times and six times the pitch.

15. The screw of claim 13, wherein the axial length extends over a maximum of one selected from the group consisting of: eight times, seven times and six times the pitch.

16. The screw of claim 1, wherein the thread being located in the unhardened portion has a standard design as far as geometry is concerned.

17. The screw of claim 16, wherein no bore is arranged in the unhardened portion.

18. The screw of claim 1, wherein the screw includes a bainite structure.

* * * * *